UNITED STATES PATENT OFFICE 2,166,433

PROCESS FOR RESOLVING PETROLEUM EMULSIONS

Melvin De Groote, University City, Mo., assignor, by mesne assignments, to Petrolite Corporation, Ltd., a corporation of Delaware No Drawing. Application May 31, 1938,
Serial No. 211,038

6 Claims. (Cl. 196—4)

This invention relates to the treatment of emulsions of mineral oil and water, such as petroleum emulsions, and has for its object to provide a novel process for resolving or breaking petroleum emulsions of the water-in-oil type into their component parts of oil and water or brine.

The treating agent or demulsifying agent employed in the present process is a new composition of matter consisting of a certain kind of complex amine derived by reaction between (a) acid esters obtained from phthalated monoricinolein, phthalated diricinolein, phthalated monoolein, phthalated di-olein, phthalated mononaphthenin, phthalated monoabietin, or similar material; and (b) simpler amines of the kind hereinafter described, and the process involves subjecting a petroleum emulsion of the water-in-oil type to the action of said demulsifying agent, so as to cause the emulsion to break down and separate into its component parts of oil and water or brine when the emulsion is permitted to remain in a quiescent state after treatment, or is subjected to other equivalent separatory procedures.

Inasmuch as the demulsifying agent employed in my process constitutes a new chemical compound or new composition of matter, I deem it advisable to describe the raw materials entering into the manufacture of the same, as well as the method of manufacture.

One can obtain or manufacture chemical compounds whose composition is indicated by the following formulas:

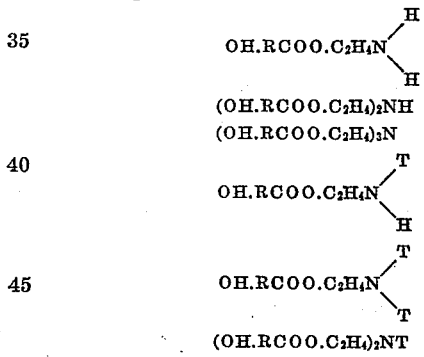

The compounds above described may be summarized by the following formula:

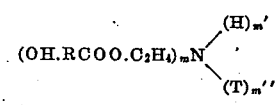

in which $m$ represents the numeral 1, 2, or 3, $m'$ represents the numeral 0, 1 or 2, and $m''$ represents the numeral 0, 1 or 2, with the proviso that $m+m'+m''=3$.

However, the radical $C_2H_4$ which appears in the above formula may represent any similar radical, such as a $C_3H_6$ radical, $C_4H_8$ radical, etc., and therefore, the above formula may be rewritten.

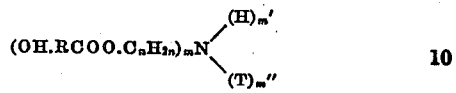

where $n$ represents a small whole number preferably not over 10.

In the above formulas, T represents a non-hydroxy aliphatic hydrocarbon radical, such as a methyl, ethyl, propyl, amyl, or similar radical; or T may represent a non-hydroxy alicyclic radical, such as a cyclohexyl radical, or a non-hydroxy aralkyl radical such as a benzyl radical; or the acylated radical obtained by replacing a hydrogen atom of the hydroxyl group of an alkylol radical by the acyl radical of a monobasic carboxy acid, such as acetic acid, butyric acid, oleic acid, stearic acid, naphthenic acid, abietic acid, or the like, all of which are characterized by having less than 32 carbon atoms. The alkylol radical prior to acylation may be a hydroxy alicyclic or a hydroxy aralkyl radical, provided that the hydroxy radical is attached to the aliphatic residue of the aralkyl radical. In the above formulas, OH.RCOOH represents a hydroxylated fatty acid, such as ricinoleic acid, hydroxystearic acid, dihydroxystearic acid, diricinoleic acid, triricinoleic acid, polyricinoleic acid, etc.; and OH.RCOO represents the oxy acyl radical derived from such acid, i. e., the ordinary acid radical. Blown oils (oxidized oils) are not included.

As to the amines above described which happen to be tertiary amines, it may be well to point out that these may be formed readily by a reaction involving an ester of the hydoxylated fatty acid and a corresponding amine. This may be illustrated in the following manner:

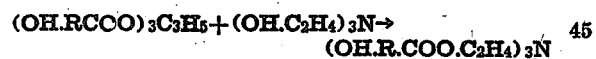

Reference is made to copending application for patent Serial No. 180,993, filed December 21, 1937, by Melvin De Groote, Bernhard Keiser and Charles M. Blair, Jr. If triethanolamine as employed in the above formula is replaced by ethyl diethanolamine or by diethyl ethanolamine, then one would readily obtain the other two types of tertiary amines illustrated. Reference is made to copending application for patent Serial No.

206,904, filed May 9, 1938, by De Groote, Keiser and Blair.

In the remaining three types of materials there is at least one amino hydrogen atom present. The manufacture of such type material may be illustrated by the following reactions:

```
OH.R.COOH+OHC2H4OH→OH.R.COO.C2H4OH
OH.R.COO.C2H4OH+HCl→OH.R.COO.C2H4Cl

OH.R.CO.Cl+OHC2H4OH→OH.R.COO.C2H4OH
OH.R.COO.C2H4OH+HCl→OH.R.COO.C2H4Cl

OH.R.COOH+OHC2H4Cl→OH.R.COO.C2H4Cl
OH.R.COOR'+OHC2H4Cl→OH.R.COO.C2H4Cl
OH.R.CO.Cl+OHC2H4Cl→OH.R.COO.C2H4Cl

OH.R.COO.C2H4Cl+NH3→OH.R.COO.C2H4NH2
2OH.R.COO.C2H4Cl+NH3→(OH.R.COO.C2H4)2NH
```

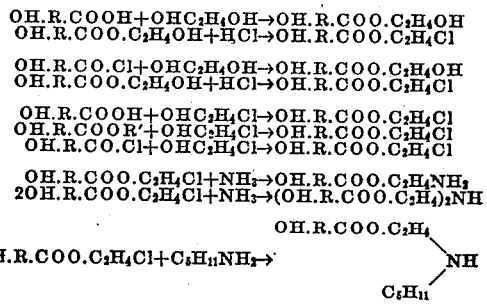

Similar reactions to the one immediately preceding result in compounds such as

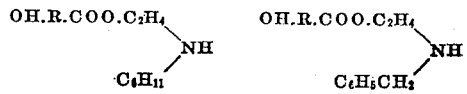

However, if maximum yields are not necessary, one need not resort to reactions of the kind previously described to produce amines having at least one amino hydrogen, but one may employ the following reactions:

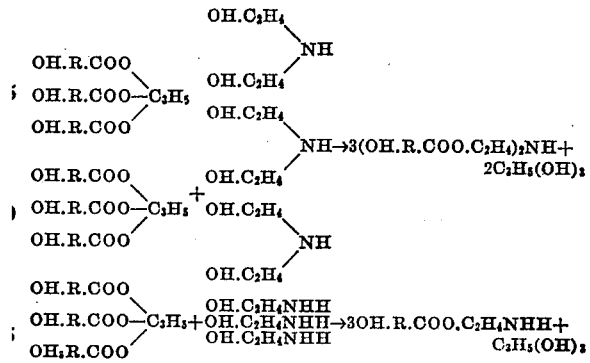

Naturally, if ethyl ethanolamine or a similar amine were to replace ethanolamine (monoethanolamine), one would obtain the remaining type of amine above illustrated.

Suitable primary and secondary amines which may be employed to produce materials of the kind above described include the following: diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzyl ethanolamine, benzyl propanolamine, pentanolamine, hexanolamine, octyl ethanolamine, octadecylethanolamine, cyclohexanol ethanolamine, etc.

Similarly, suitable tertiary amines which may be employed include the following: triethanolamine, diethanolalkylamines, such as diethanol ethylamine, diethanol propylamine, etc. Other examples include diethanol methylamine, tripropanolamine, dipropanol methylamine, cyclohexanol diethanolamine, dicyclonexanol ethanolamine, cyclohexyl diethanolamine, dicyclohexyl ethanolamine, dicyclohexanol ethylamine, benzyl diethanolamine, dibenzyl ethanolamine, benzyl dipropanolamine, tripentanolamine, trihexanolamine, ethyl hexyl ethanolamine, octadecyl diethanolamine, polyethanolamine, etc.

It is also known that one may have amines of the type:

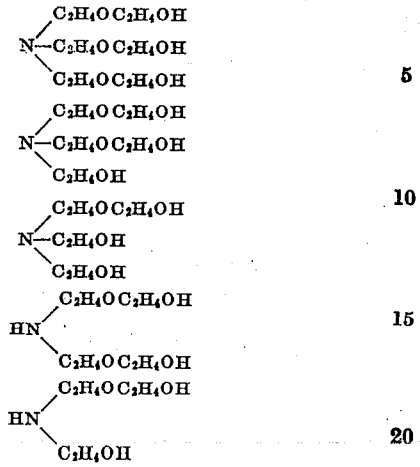

Such amines may serve as functional equivalents of the previously described amines and which are free from an ether linkage.

All the amines of the kind above described and characterized by the formula:

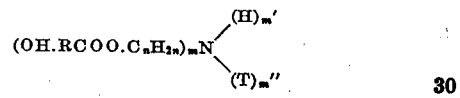

in which $n$ represents a small whole number, preferably less than 10, and $m$ represents the numeral 1, 2 or 3, $m'$ represents the numeral 0, 1 or 2, and $m''$ represents the numeral 0, 1 or 2, with the proviso that $m+m'+m''=3$, have four common characteristics. In the first place, these amines are not quaternary ammonium bases or salts thereof. The expression "quaternary ammonium" is properly and conventionally applied to compounds in which all four hydrogen atoms of the ammonium radical NH4 have been replaced by a hydrocarbon radical or oxy-hydrocarbon radical, as, for example, in trimethyl phenyl ammonium hydroxide.

Secondly, an important characteristic which must be recognized is that these amine compounds are not amides. It is to be noted that an amide formation involves a product in which there is a direct linkage between the carboxylic carbon atom and the nitrogen atom in the amine. This is not the case in the compounds employed as intermediate raw materials for production of the compounds used as demulsifying agents in this process.

In the third place, it must be recognized that these compounds are derived only from basic amines. The word "basic" is employed to exclude amines having little or no basicity, such as the ordinary aromatic amines, or any amine having at least one aryl radical directly joined to the amino nitrogen atom. For this reason, these amine products which are herein contemplated as demulsifying agents and which necessarily are characterized by freedom from any aryl groups as such, cannot be derived from aryl amines. They are derived solely from alkyl, alicyclic, or aralkyl amines having at least one hydroxyl group present. It is true that in the aralkyl amines there is an aryl group present, but it is not directly attached to the nitrogen atom, as in the case of aryl amines, but in fact, represents nothing more or less than a substituted alkylamine. For instance, I consider benzylamine as being the primary amine, phenmethyl amine.

Finally, it must be recognized that these materials have not lost any basicity in the forms of the esterified amine and that they exhibit all the properties of a basic amine, that is, they combine with water to form a base presumably a substituted ammonium compound, but not quarternary ammonium compounds, insofar that there are always one, two or three unsubstituted hydrogen atoms of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts, as well as the amines themselves. The characteristic demulsifying properties of the new compositions of matter herein described are contributed in part by the amine, and it is immaterial whether the amine may be considered as being in any one of the following forms:

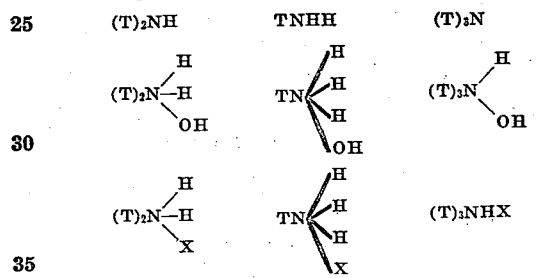

in which T represents the substituents for the amino hydrogen atoms of the parent ammonia from which all amines are hypothetically derived and X simply represents the acid radical of any acid employed. This statement applies with equal force and effect to the final product, or composition of matter, which is also a basic amine of a more complex type.

Reference is again made to the formula which summarizes the various amines used as intermediate raw materials, viz.:

in which the characters have their previous significance.

Attention is directed to the fact that where the substituted alkyl radical $OH.R.COO.C_2H_4$— appears, a suitable non-aryl radical other than an aliphatic residue may serve as the functional equivalent; for instance, an alicyclic radical derived from a cyclohexyl radical or an aralkyl radical derived from a benzl radical. In other words, in the hereto appended claims reference to the $C_nH_{2n}$ radical as such or as an alkyl radical or residue is intended in the broad sense to include the alicyclic radicals or residues or the aralkyl radicals or residues which are the equivalent thereof. There is no intention to include an aromatic radical where there is a direct linkage between the aromatic nucleus and the amino hydrogen atom for the reason that such products have little or no basicity and do not have the characteristic properties of the amines previously described.

In indicating the various hydroxylated tertiary amines of the non-aryl type which may be employed to produce the amine contemplated as the demulsifying agent of the present process, it is desirable to indicate that amines of the type where a hydroxy acyl radical replaces a hydrogen atom of the hydroxyl radical of the hydroxy tertiary amine, are not included within the broad class of hydroxy tertiary amines, unless there is another hydroxyl radical attached to the usual alkyl radical. For instance, if diethyl amino ethanol is treated with lactic acid so as to form lactyl ethanol diethylamine of the following formula:

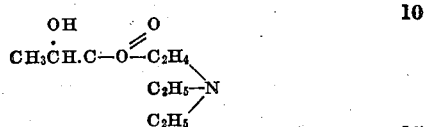

then it is understood that such materials would not represent a hydroxy tertiary amine within the meaning or scope, as herein employed. If, on the other hand, triethanolamine were treated with lactic acid so as to give monolactyl triethanolamine of the following composition:

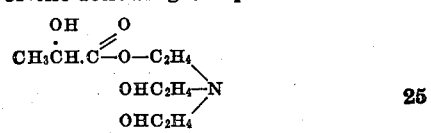

then such compound would be included, due to the presence of one or more hydroxyl radicals attached to the alkyl radicals.

Similarly, in indicating the various hydroxylated primary or secondary amines of the non-aryl type which may be employed to produce the amine contemplated as the demulsifying agent of the present process, it is desirable to indicate that amines of the type where a hydroxyl acyl radical replaces a hydrogen atom of the hydroxyl radical of a hydroxy primary or secondary amine, are not included within the broad class of hydroxy tertiary amines, unless there is another hydroxyl radical attached to the usual alkyl radical. For instance, if ethanolamine is treated with lactic acid so as to form the lactyl derivative of the following formula:

then it is understood that such materials would not represent a hydroxy primary amine within the meaning or scope, as herein employed. The same would be true if the corresponding product derived from diethanolamine, provided that both hydroxy radicals have been esterified with lactic acid. If, on the other hand, diethanolamine were treated with lactic acid so as to give monolactyl diethanolamine of the following composition:

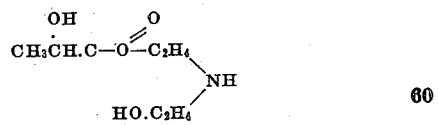

then such compound would be included, due to the presence of the hydroxyl radicals attached to the alkyl radicals.

The manufacture of compounds from tertiary amines is relatively simple, because no precautions are necessary to prevent amidification. The selected fatty oil and the selected hydroxy tertiary amine are mixed in suitable proportions and heated at some point above the boiling point of water, for instance, 110° C., and at a point below the decomposition point of the amine or the fatty oil, for instance, 180° C., for a suitable period of time, such as two to eight hours. Mild agitation is employed. A catalyst, such as sodium oleate, sodium carbonate, caustic soda, etc., may be present in amounts of about one-half of 1%, or less. It is noted that the fatty acids are employed in this instance in the form of an ester, to wit, the glyceride, although as previously pointed out, other functional equivalents can be readily employed with equal facility. It is to be noted that the reactions above described do not take place to any appreciable extent if the fatty acid has been converted into the soap or salt. Such salts are not functional equivalents.

When, however, one is employing a hydroxy primary or a hydroxy secondary amine, precautions must be taken so that one gets a substantial percentage of products derived by esterification, rather than amidification. Any suitable ester may be employed, but it is often most convenient to use the glyceride, for instance, triricinolein.

The selected glyceride and the selected hydroxy primary or secondary amine are mixed in suitable proportions and heated at some point above the boiling point of water, for instance, 110° C., and below the decomposition point of the amine or fatty material, for instance, 180° C., for a suitable period of time, such as 4–24 hours. Mild agitation is employed. A catalyst, such as sodium oleate, sodium carbonate, caustic soda, etc., may be present in amounts of about ½%, or less. It is to be noted that the fatty acids are present in ester form and not in the form of the free acid, and thus there is no tendency to form the salt to any marked extent, and if conducted at the lower range of reaction temperatures, there is a decided tendency to form the esterification products, rather than the amidification products.

In order to illustrate suitable examples of the amines which may be used as intermediate raw materials, the following examples are given:

*Intermediate amine—Example 1*

Castor oil is employed. For sake of convenience, its molecular weight is considered as being 925. Commercial triethanolamine and castor oil in the proportion of one mole of castor oil to one mole of triethanolamine are heated to a temperature between 150° and 180° C. for about 2 hours. Mild agitation is employed. The reaction product so produced may be used as such, or may be converted into the acetate or other suitable form.

*Intermediate amine—Example 2*

Polyethanolamine:

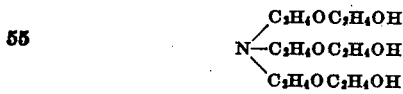

is substituted for triethanolamine in Example 1.

*Intermediate amine—Example 3*

Ethyl dihydroxy stearate is reacted in the previous manner with the various amines above enumerated in Examples 1 and 2. In this case three moles of ethyl dihydroxy stearate are reacted with one mole of the tertiary hydroxy-amine.

*Intermediate amine—Example 4*

Methyl hydroxy stearate is employed to replace ethyl dihydroxy stearate in the examples indicated under Example 3 above.

*Intermediate amine—Example 5*

Castor oil (triricinolein) is employed. For convenience its molecular weight is considered as being 925. Commercial diethanolamine and castor oil in the proportion of two moles of castor oil to three moles of diethanolamine are heated at a temperature of 120–140° C. for about 12 hours. Mild agitation is employed. Loss of basicity is an indication of amidification. Time of reaction may be extended or temperature lowered or raised so as to insure maximum esterification. The reaction product so produced may be used as such, or may be converted into the acetate or other suitable form.

*Intermediate amine—Example 6*

Ethanolamine is substituted for diethanolamine in Example 1, using three moles of ethanolamine for one mole of castor oil.

*Intermediate amine—Example 7*

Ethyl ethanolamine is substituted for diethanolamine in Example 1, using three moles of ethyl ethanolamine for one mole of castor oil.

*Intermediate amine—Example 8*

An ether amine of the following composition:

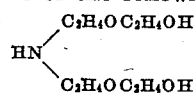

is substituted for diethanolamine in Example 5.

Having prepared the relatively simpler intermediate amines of the kind previously described, the second step in the preparation of the new composition of matter is to produce acid esters of the kind obtainable by reaction between polybasic carboxy acids or their functional equivalents, such as the anhydrides and esters of detergent-forming acids or the like. Detergent-forming acids are monobasic carboxy acids, such as typical fatty acids, abietic acids, or napthhenic acids. Typical fatty acids are those which occur in naturally-occurring oils and fats and generally have 8 or more carbon atoms and not over 32 carbon atoms. Common examples include oleic acid, stearic acid, linoleic acid, linolenic acid, ricinoleic acid, erucic acid, palmitic acid, myristic acid, etc. These various acids combine with alkali to produce soap or soap-like materials, and are commonly referred to as being monobasic detergent-forming acid. Blown oils (oxidized oils) are not included.

Detergent-forming acids combine with polyhydric alcohols to give esters characterized by the presence of at least one hydroxyl radical attached to the radical which replaces the carboxylic hydrogenation. Polyhydric alcohols include glycerol, ethylene glycol, propylene glycol, and other similar glycols, and also a polyhydroxy ether alcohol type of material such as diethylene glycol, diglycerol, triglycerol, etc. Such materials, whether produced from glycerol or from glycol or from two dissimilar polyhydric alcohols, are characterized by the fact that dehydration produces an oxygen linkage between two organic residues, and thus the material, in addition to having the properties of a polyhydric alcohol, has to some degree at least, the properties of an ether.

As to the manufacture of esters from an alcohol, including polyhydric alcohols, and a carboxy acid, the usual procedure is esterification in presence of dry hydrochloric acid gas. Such method is satisfactory, provided that conditions are controlled so that complete esterification does not take place, and thus result in a material containing no free hydroxyl in the polyhydric alcohol residue. For example, if diglycerol is esterified with four molecules of ricinoleic acid, the resultant product will not contain a free hydroxy group in the polyglycerol residue. However, if esterification is continued so that one, two, or three ricinoleic acid residues are introduced, and so that three, two, or one free hydroxyl residues remain in the polyglycerol radical, then a suitable compound is produced. Esterifications to produce the desired product may be conducted in the conventional manner usually employed in such reactions.

It is, of course, obvious that esters may be produced as readily from naphthenic acid or abietic acid or the like, as from fatty acids. For sake of brevity, reference will be made particularly to fatty acids. A large number of materials derived from fatty acids and characterized by the presence of a free hydroxyl attached to the hydrocarbon radical which replaces the carboxylic hydrogen, is available in the open market and sold under the name of "superglycerinated fats". Such materials are used as emulsifying agents, both in edible and non-edible products. They are derived from a wide variety of acids and a wide variety of polyhydric alcohols of both the ether type and the non-ether type.

The following formulas indicate the types derivable from non-hydroxylated monobasic carboxy acids:

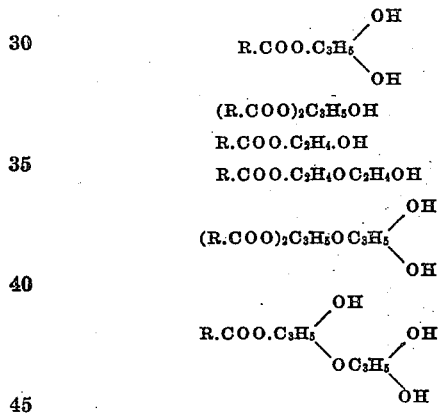

If derived from hydroxylated fatty acids, such as hydroxystearic acid, ricinoleic acid, and the like, the above formulas would correspond to the following:

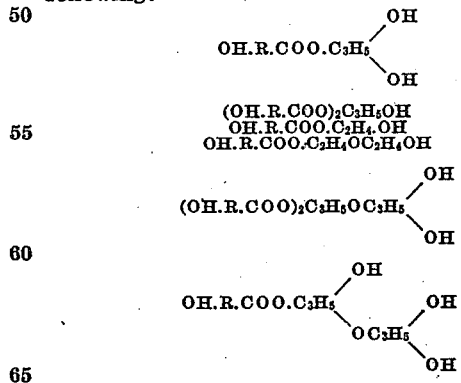

If such products are reacted with polybasic carboxy acids, or their anhydrides, as, for example, phthalic acid or phthalic anhydride, one can obtain a large number of esters which are acidic esters in the sense that there is present a free carboxyl radical. In the following formulas, no attempt is made to show phthalic anhydride as the usual ortho compound, but it is shown as a para compound, purely for the sake of convenience. The selection of phthalic acid is purely for purposes of illustration. Any one of a number of other acids may be employed.

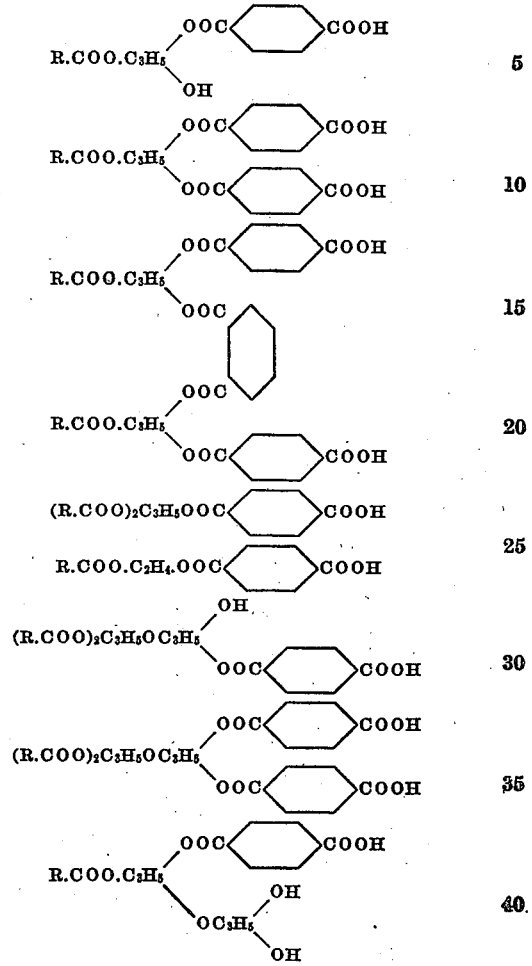

If, however, such materials were derived from hydroxylated fatty acids without involving the alcoholiform hydroxyl attached to the fatty acid radical, then the above formula would appear as follows:

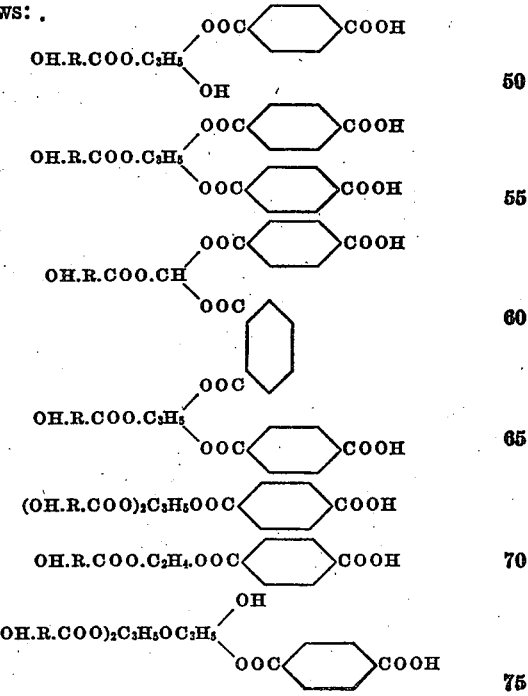

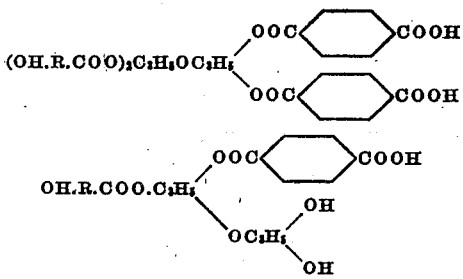

However, if one considers the reactions in which only the alcoholiform hydroxyl of the fatty acid radical, for example, ricinoleic acid, is involved in formation of the reaction products obtained, then they may be indicated by the following formulas:

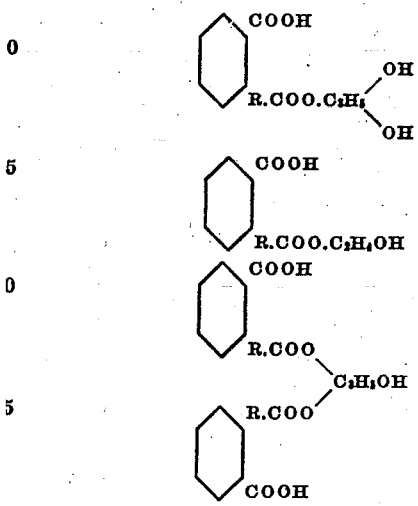

Similarly, one may have products in which both the alcoholic hydroxyl attached to the fatty acid radical and also the hydroxyl attached to the glycerol or glycol radical are reacted with phthalic anhydride or its equivalent, so as to produce reagents indicated by the following formulas:

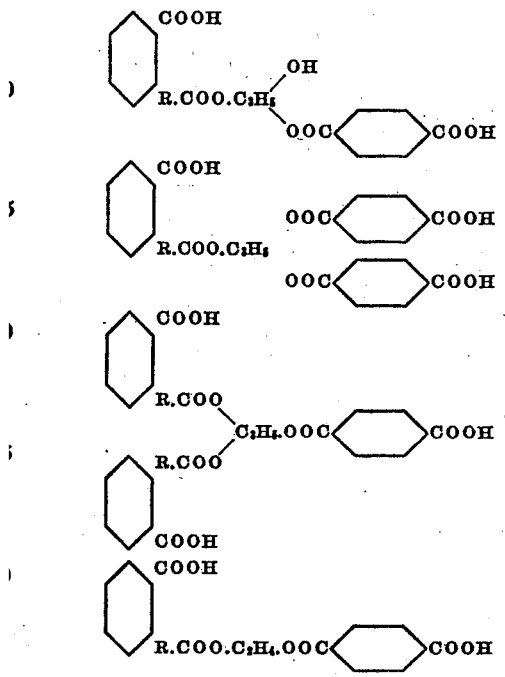

In the examples shown above, where the ester is polybasic, one might remove the acidity of one of the carboxylic hydrogen atoms or two of the carboxylic hydrogen atoms in any feasible manner, that is, by neutralization with an alkali or by conversion into an ester involving a reaction with any suitable alcohol, i. e., a monohydric, trihydric, etc. In any event, however, the material derived by reaction between a polybasic acid or its functional equivalent and the hydroxylated ester type of fatty material of the kind described, is always characterized by the presence of at least one free carboxyl radical.

Where reference is made to ricinoleic acid, hydroxy-stearic acid, abietic acid, and the like, it is evident that certain simple derivatives, such as the halogenated compounds, are the obvious functional equivalents; for instance, chlorinated ricinoleic acid may be employed instead of ricinoleic acid; brominated oleic acid might be employed instead of oleic acid; hydrogenated abietic acid might be employed instead of abietic acid. In these instances, the monobasic detergent-forming carboxy material, notwithstanding modifications of the kind indicated, still has the same functional properties as the unmodified material, and thus acts in the same manner as far as chemical reactions noted are concerned, and also as far as producing an effective demulsifying agent is concerned. In the hereto appended claims, reference to monobasic detergent-forming carboxy acids includes such obvious functional equivalents.

As to the manufacture of reagents from polybasic carboxy acids and superglycerinated fats or the like, it need simply be stated that these reagents have been produced and used in the arts as plasticizers, demulsifying agents, etc., and that the method of producing the same is well known. Briefly stated, esterification takes place readily on the application of heat, and the reaction may be hastened by employing a higher temperature, provided that decomposition does not take place; or the reaction may be conducted in presence of an inert solvent, such as xylene, which may be removed after completion of reaction. The reaction can be hastened also by passing through the mixture a dried inert gas; or the reaction may be conducted under a reflux condenser using material such as xylene and a water trap, so as to remove water as quickly as formed. Generally speaking, however, the reactions take place rapidly, quickly, and completely by simply heating the products together in stoichiometric proportions at a temperature somewhere above the boiling point of water, and particularly at a temperature of about 110–160° C., provided there is no decomposition. Phthalic anhydride is particularly suitable, because it does not decompose readily, whereas, some other acid, such as oxalic acid, may be equally desirable, but the temperature of esterification must be lower, of course, to prevent decomposition.

The polybasic acids which may be employed, including some having at least three carboxyl radicals, are phthalic, succinic, malic, fumaric, citric, maleic, adipic, tartaric, glutaric, diphenic, naphthalic, oxalic, etc.

It is to be noted that the manufacture of the composition of matter in reality involves three different esterification reactions. For example, a fatty acid may be reacted with a tertiary hydroxy-amine to give products of the kind indicated. Naturally, if the tertiary amine, such as triethanolamine, is reacted with a glyceride, the reaction may, in essence, be a rearrangement reaction, rather than an esterification reaction, although for purposes of classification, it may be considered as an esterification reaction. The second esterification reaction involved is the one between the hydroxy fatty body of the kind described, such as superglycerinated fats and phthalic anhydride or the like. Monoabietin or mononaphthenin, of course, may be considered broadly as a superglycerinated fat.

The third esterification reaction is between the two types of materials above described, the simpler amine always being characterized by the presence of an alcoholic hydroxyl radical, and the ester being characterized by the presence of the carboxyl group. The last mentioned esterification reaction goes readily and is nothing more or less than a conventional esterification reaction and requires no further elaboration.

*Composition of matter—Example 1*

One employs an intermediate amine of the kind described under Intermediate amine—Example 1 above. Commercial diricinolein is treated with two moles of phthalic anhydride, so as to yield an ester having two free carboxyl radicals. One molecular weight of this acidic ester is reacted with one mole of material exemplified by Intermediate amine—Example 1, so as to yield a product characterized by the presence of both a free carboxyl radical and a free alcoholic hydroxyl radical. This is a conventional esterification reaction, and the materials are intimately mixed and heated at approximately 120-160° C. with constant agitation until samples taken from the batch and analyzed show substantially complete reaction. A suitable solvent may be present, and water formed may be distilled off continuously during the esterification process. The solvent may remain behind in the final product or be removed, if desired.

*Composition of matter—Example 2*

Diphthalated mono-olein is substituted for diphthalated diricinolein in Composition of matter—Example 1, immediately above.

*Composition of matter—Example 3*

Dimaleated monostearin is substituted for diphthalated diricinolein in Composition of matter—Example 1 above.

*Composition of matter—Example 4*

Dioxalated monoabietin is substituted for diphthalated diricinolein in Composition of matter—Example 1 above.

*Composition of matter—Example 5*

Dicitrated mononaphthenin is substituted for diphthalated diricinolein in Composition of matter—Example 1 above.

*Composition of matter—Example 6*

An amine of the kind characterized by the product described under Intermediate amine—Example 5 is substituted in the above Composition of matter—Examples 1-5 for the intermediate amine therein employed.

It should be noted, however, that this particular product contains only two hydroxyl radicals available for esterification per atom of nitrogen. Insofar that some amidification may take place in following the directions in preparing the amine from diethanolamine in Intermediate amine—Example 5 above, it is probably the safest procedure to determine the acetyl or hydroxyl value before reacting in molecular proportions so as to leave a free carboxyl radical.

Attention is directed to the fact that the alkylolamines are obtained in such a manner that they may be looked upon as being derivatives of dihydric alcohols, for instance, the chlorhydrin of the dihydric alcohol, as indicated in the following manner:

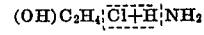

As previously stated, the $C_2H_4$ radical may be any one of a number of hydrocarbon radicals which are aliphatic, alicyclic, or aralkyl in nature.

It is at once manifest that similar derivatives are available from glycerols, polyglycerols, and the like, as indicated by the following reaction:

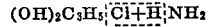

It is not necessary to point out that the same types of reactions will produce secondary or tertiary amines and that the reaction is not limited to a combination with ammonia, but may take place with a combination of other primary or secondary amines, such as amylamine, diamylamine, cyclohexylamine, dicyclohexylamine, benzylamine, dibenzylamine, amylcyclohexylamine, etc.

This means that in the type of material previously described, there is a wide variety of material, such as monoglycerylamine, diglycerylamine, monoglyceryl diethylamine, monoglyceryl dipropylamine, diglyceryl propylamine, triglycerylamine, etc., which are functional equivalents of the various amines previously described for reaction with triricinolein and the like. When such amines are employed instead of the radical —$C_nH_{2n}$ appearing in a compound, one would have in place thereof the radical —$OH.C_3H_5$—; or in case the hydroxyl radical of these —$OH.C_3H_5$— radical had been removed by esterification with any available carboxyl, then the substituent which replaces the —$C_nH_{2n}$— radical might be indicated by the formula —$D.C_3H_5$—. All that has been said here in regard to functional equivalents will be perfectly obvious without further explanation to those skilled in the art. See United States Patent No. 2,091,704, dated August 31, 1937, to Duncan and McAllister; also United States Patent No. 2,042,621, dated June 2, 1936, to Olin.

Similarly, it is evident that where reference is made to phthalic acid, some simple derivative, such as chlorinated phthalic acid, brominated phthalic acid, methylated phthalic acid, or the like, would simply act as a functional equivalent. This applies not only to phthalic acid, but all the dibasic acids enumerated.

Similarly, it is evident that there is no intention to differentiate between isomeric forms. One isomeric form may serve as well as another. Attention is particularly called to the last two examples above, which are characterized especially by the presence of a free carboxyl radical other than the carboxyl radical derived from dibasic acid.

I desire to emphasize that the products obtained in the above examples may be used in the form of the amine by direct contact with an emulsion without contact with water. It may be contacted with water, i. e., in the form of a solution so as to produce in a greater or lesser degree the amine base. Furthermore, any of the products above described may be combined with a suitable acid. Acetic acid may be employed. Hydrochloric acid is particularly desirable. In some instances acids, such as oleic acid or naphthenic acid, may be employed to give a suitable salt. As previously pointed out, any carboxylic hydrogen atom may be replaced by a suitable metallic atom or an organic radical derived from an alcohol or from an amine. All such ionizable hydrogen atom equivalents are considered as the functional equivalent of the ionizable hydrogen atoms themselves, and such neutralized forms are included in the scope of the appended claims as the equivalent of the acidic form. It is realized that where a free carboxyl and a basic amine residue exist in the same molecule, there may be a tendency towards the formation of inner salts comparable to sulfanilic acid; but due to the size of the molecule involved, and perhaps for reasons of steric hindrance, I am not aware that such inner salts are formed.

Briefly, then, the preparation of the composition of matter herein contemplated depends on a reaction involving a polybasic carboxy acid body, or its functional equivalent, as described, and the complex amine of the kind described, in such a manner as to involve reactions other than salt formation. In other words, the complex amines are basic in nature, and therefore, could react with a polybasic acid to form a salt in a manner which, for sake of convenience, will be indicated by a somewhat simpler reaction, thus:

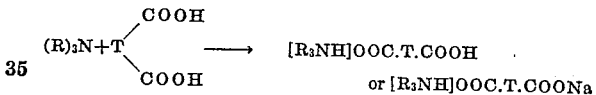

Such reactions are purely salt formation. The materials of the kind herein contemplated, regardless of their nature, are of the kind obtained by reactions other than salt formation, and also other than amidification.

I desire to emphasize that the expression "polybasic carboxy acid" as it appears in the claims, refers not only to the acid itself, but to any functional equivalent, such as the anhydride, the acyl chloride, a salt form having at least two free carboxyls, such as mono-sodium citrate, etc. It is also understood that in the hereto appended claims the nature of the final product is not limited to the form having a free carboxylic hydrogen, but that such free carboxylic hydrogen may actually be replaced by any functional equivalent of the kind previously described, for instance, a metallic atom, an ammonium radical, an amine radical, such as an amylamine radical, benzylamine radical, ethanolamine radical, diethanolamine radical, triethanolamine radical, a hydrocarbon radical, such as an ethyl, methyl, propyl, or amyl radical, a radical derived from ethylene glycol, glycerol, or the like; a cyclohexyl radical, benzyl radical, etc. All such forms in which such ionizable hydrogen atom equivalent replaces an ionizable hydrogen atom, are obvious functional equivalents.

Attention is directed to the fact that the word "amidification" has been applied to the reaction involving the replacement of an amino hydrogen atom by an acyl radical without conventional limitation to a reaction involving ammonia. The replacement of the amino hydrogen atom of a primary amine or a secondary amine by an acyl radical has been considered as being amidification, rather than the formation of a substituted amide or the formation of an imide or substituted imide. Such obvious departure from conventional nomenclature has been for purposes of simplicity and to show the similarity between certain reactions.

It is desirable to emphasize again that in the hereto appended claims reference to a polybasic carboxy acid includes not only the acid itself, but also various salts and esters thereof and also other functional equivalents, such as the anhydrides, acyl chlorides, etc. Furthermore, in the hereto appended claims, reference to the product derived by reaction between an acid ester of the kind previously described and an amine of the kind previously described, is meant to refer to such products in all its various modifications previously referred to, to wit, such instances where carboxylic hydrogen atoms appear as such, or have been replaced by metallic atoms, organic radicals derived from various alcohols, amine radicals, or residues, etc.; and as to the presence of any basic amine nitrogen atom, it may be in the amine form, or in a salt form, or in a base form, as, for example, obtainable by contact with water. The functional equivalents of all these variations have been pointed out previously, and were readily comprehended; and the scope of the claims, in light of such obvious equivalents, requires no further discussion.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The new composition of matter that is employed as the demulsifying agent in my process herein described constitutes the subject-matter of my pending application for patent Serial No. 261,093, filed March 10, 1939.

Having thus described my invention, what I claim as new and desire to secure by Letters Patent is:

1. A process for breaking petroleum emulsions of the water-in-oil type, characterized by subjecting the emulsion to the action of a demulsifying agent comprising products of the kind derivable by esterification reaction between (A) an amine of the formula type:

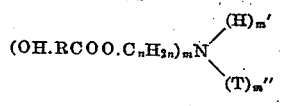

in which OH.RCOO represents the oxy-acyl radical derived from a hydroxylated fatty acid; T represents a non-hydroxy hydrocarbon radical or the acylated radical obtained by replacing the hydrogen atom of the hydroxyl group of an alkylol radical by the acyl radical of a monobasic carboxy acid having less than 32 carbon atoms; $n$ represents a small whole number which is less than 10; $m$ represents the numeral 1, 2 or 3; $m'$ represents the numeral 0, 1 or 2, and $m''$ represents the numeral 0, 1 or 2, with the proviso that $m+m'+m''=3$; and (B) an acidic ester derived by reaction between a polybasic carboxy acid and a hydroxylated ester of a monobasic detergent-forming carboxy acid of the kind in which there is at least one hydroxyl radical attached to the alcohol residue; said acidic ester being characterized by the presence of at least one carboxyl radical.

2. A process for breaking petroleum emulsions of the water-in-oil type, characterized by subjecting the emulsion to the action of a demulsifying agent comprising products of the kind derivable by esterification reaction between (A) an amine of the formula type:

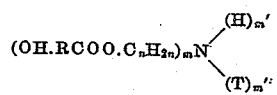

in which OH.RCOO represents the oxy-acyl radical derived from a hydroxylated fatty acid; T represents a non-hydroxy hydrocarbon radical or the acylated radical obtained by replacing a hydrogen atom of the hydroxyl group of an alkylol radical by the acyl radical of a monobasic carboxy acid having less than 32 carbon atoms; $C_nH_{2n}$ being an aliphatic radical; $n$ represents a small whole number which is less than 10; $m$ represents the numeral 1, 2 or 3; $m'$ represents the numeral 0, 1 or 2, and $m''$ represents the numeral 0, 1 or 2, with the proviso that $$m+m'+m''=3;$$

and (B) an acidic ester derived by reaction between a polybasic carboxy acid and a hydroxylated ester of a monobasic detergent-forming carboxy acid of the kind in which there is at least one hydroxyl radical attached to the alcohol residue; said acidic ester being characterized by the presence of at least one carboxyl radical.

3. A process for breaking petroleum emulsions of the water-in-oil type, characterized by subjecting the emulsion to the action of a demulsifying agent comprising products of the kind derivable by esterification reaction between (A) an amine of the formula type:

$$(OH.RCOO.C_2H_4)_mN\begin{matrix}(H)_{m'}\\(T)_{m''}\end{matrix}$$

in which OH.RCOO represents the oxy-acyl radical derived from a hydroxylated fatty acid; T represents a non-hydroxy hydrocarbon radical or the acylated radical obtained by replacing a hydrogen atom of the hydroxyl group of an alkylol radical by the acyl radical of a monobasic carboxy acid having less than 32 carbon atoms; $m$ represents the numeral 1, 2 or 3; $m'$ represents the numeral 0, 1 or 2, and $m''$ represents the numeral 0, 1 or 2, with the proviso that $m+m'+m''=3$; and (B) an acidic ester derived by reaction between a polybasic carboxy acid and a hydroxylated ester of a fatty acid of the kind in which there is at least one hydroxyl radical attached to the alcohol residue; said acidic ester being characterized by the presence of at least one carboxyl radical.

4. A process for breaking petroleum emulsions of the water-in-oil type, characterized by subjecting the emulsion to the action of a demulsifying agent comprising products of the kind derivable by esterification reaction between (A) an amine of the formula type:

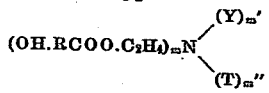

in which OH.RCOO represents the oxy-acyl radical derived from a hydroxylated fatty acid; T represents a non-hydroxy hydrocarbon radical; $m$ represents the numeral 1, 2 or 3; $m'$ represents the numeral 0, 1 or 2, and $m''$ represents the numeral 0, 1 or 2, with the proviso that $m+m'+m''=3$; and (B) an acidic ester derived by reaction between a polybasic carboxy acid and a hydroxylated ester of a fatty acid of the kind in which there is at least one hydroxyl radical attached to the alcohol residue; said acidic ester being characterized by the presence of at least one carboxyl radical.

5. A process for breaking petroleum emulsions of the water-in-oil type, characterized by subjecting the emulsion to the action of a demulsifying agent comprising products of the kind derivable by esterification reaction between (A) an amine of the formula type:

$$(OH.RCOO.C_2H_4)_mN(H)_{m'}.$$

in which OH.RCOO represents the oxy-acyl radical derived from a hydroxylated fatty acid; $m$ represents the numeral 1, 2 or 3; $m'$ represents the numeral 0, 1 or 2, with the proviso that $m+m'=3$; and (B) an acidic ester derived by reaction between a polybasic carboxy acid and a hydroxylated ester of a fatty acid of the kind in which there is at least one hydroxyl radical attached to the alcohol residue; said acidic ester being characterized by the presence of at least one carboxyl radical.

6. A process for breaking petroleum emulsions of the water-in-oil type, characterized by subjecting the emulsion to the action of a demulsifying agent comprising products of the kind derivable by esterification reaction between (A) an amine of the formula type:

$(OH.RCOO.C_2H_4)_m N(H)_{m'}$ in which OH.RCOO represents the oxy-acyl radical derived from ricinoleic acid; $m$ represents the numeral 1, 2 or 3; $m'$ represents the numeral 0, 1 or 2, with the proviso that $m+m'=3$; and (B) an acidic ester derived by reaction between phthalic anhydride and a hydroxylated ester of ricinoleic acid of the kind in which there is at least one hydroxyl radical attached to the alcohol residue; said acidic ester being characterized by the presence of at least one carboxyl radical.

MELVIN DE GROOTE.